US012726303B2

(12) United States Patent
He

(10) Patent No.: US 12,726,303 B2
(45) Date of Patent: Sep. 1, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 428 days.

(21) Appl. No.: 18/133,894

(22) Filed: Apr. 12, 2023

(65) Prior Publication Data

US 2023/0254081 A1 Aug. 10, 2023

Related U.S. Application Data

(63) Continuation of application No. PCT/CN2020/120296, filed on Oct. 12, 2020.

(51) Int. Cl.
*H04W 72/04* (2023.01)
*H04L 5/00* (2006.01)
(Continued)

(52) U.S. Cl.
CPC ....... *H04L 5/0048* (2013.01); *H04W 72/1273* (2013.01)

(58) Field of Classification Search
None
See application file for complete search history.

(56) References Cited

U.S. PATENT DOCUMENTS 11,540,300 B2 12/2022 Wang et al.
11,910,463 B2 * 2/2024 Hwang ............... H04W 68/005
(Continued)

FOREIGN PATENT DOCUMENTS

CN 101540633 A 9/2009
CN 101841400 A 9/2010
(Continued)

OTHER PUBLICATIONS

Vivo (R1-2005389, Discussion on TRS/CSI-RS occasion(s) for idle/inactive UEs, Aug. 17-28, 2020) (Year: 2020).*
(Continued)

*Primary Examiner* — Maharishi V Khirodhar
(74) *Attorney, Agent, or Firm* — BAYES PLLC

(57) ABSTRACT

Provided are a wireless communication method, a terminal device, and a network device. The network device can configure, for a terminal device in an idle state or an inactive state, resource information of a reference signal and/or monitoring occasion information of the reference signal, so that the terminal device in the idle state or the inactive state can perform time-frequency tracking and automatic gain control before detecting paging at a paging occasion corresponding to the terminal device. The wireless communication method comprises: a terminal device receiving a public PDCCH, wherein the terminal device is in an idle state or an inactive state, and target information borne in the public PDCCH is used for indicating at least one of the following: resource information of a reference signal and monitoring occasion information of the reference signal.

24 Claims, 4 Drawing Sheets

(51) Int. Cl.

| | |
|---|---|
| ***H04W 72/1273*** | (2023.01) |
| ***H04W 76/00*** | (2018.01) |
| ***H04W 88/08*** | (2009.01) |

(56) References Cited

U.S. PATENT DOCUMENTS

| | | | | |
|---|---|---|---|---|
| 2018/0295651 | A1* | 10/2018 | Cao | H04W 72/23 |
| 2021/0044401 | A1* | 2/2021 | Yoon | H04B 7/088 |
| 2021/0092627 | A1* | 3/2021 | Radulescu | H04L 5/0053 |
| 2021/0105739 | A1* | 4/2021 | Lin | H04L 5/005 |

FOREIGN PATENT DOCUMENTS

| | | |
|---|---|---|
| CN | 109474385 A | 3/2019 |
| CN | 110035567 A | 7/2019 |

OTHER PUBLICATIONS

Qualcomm Incorporated (R1-2006816, TRS/CSI-RS for idle/inactive UE power saving, Aug. 17-Aug. 28, 2020) (Year: 2020).*

Huawei, HiSilicon (R1-2005263, Assistance RS occasions for Idle/inactive mode, Aug. 17-28, 2020) (Year: 2020).*

Communication pursuant to Article 94(3) EPC issued in corresponding European Application No. 20956922.7, mailed Jul. 29, 2024, 7 pages.

Notice of priority examination of patent application issued in corresponding Chinese Application No. 202311318837.6, mailed on Sep. 20, 2024, 8 pages.

First Office Opinion Notice issued in corresponding Chinese Application No. 202311318837.6, mailed Sep. 23, 2024, 20 pages.

International Search Report issued in international application No. PCT/CN2020/120296, mailed Jul. 22, 2021, 4 pages.

Written Opinion of the International Searching Authority issued in international application No. PCT/CN2020/120296, mailed Jul. 22, 2021, 8 pages.

"3rd Generation Partnership Project; Technical Specification Group Radio Access Network; NR; Radio Resource Control (RRC) protocol specification (Release 16)", 3GPP TS 38.331 V16.0.0 (Mar. 2020), 832 pages.

"TRS/CSI-RS for idle/inactive UE power saving", Agenda item: 8.7.1.2, Source: Qualcomm Incorporated, 3GPP TSG-RAN WG1 #102-e, R1-2006816, e-Meeting, Aug. 17-Aug. 28, 2020, 4 pages.

"3rd Generation Partnership Project; Technical Specification Group Radio Access Network; NR; Multiplexing and channel coding (Release 16)", 3GPP TS 38.212 V16.1.0 (Mar. 2020), 141 pages.

"3rd Generation Partnership Technical Specification Group Radio Access Network; NR; Physical layer procedures for control (Release 16)", 3GPP TS 38.213 V16.2.0 (Jun. 2020), 176 pages.

Extended European Search Report issued in corresponding European application No. 20956922.7, mailed Oct. 19, 2023.

Source: Moderator (Samsung); Title: Summary for TRS/CSI-RS occasion(s) for idle/inactive UEs 3GPP TSG RAN WG1 #102-e R1-200xxxx e-Meeting, Aug. 17-28, 2020.

First Office action issued in corresponding Korean Application No. 10-2023-7015872, mailed on Jul. 17, 2025, 10 pages.

First Office action issued in corresponding India Application No. 202327033376, mailed on Sep. 29, 2025, 6 pages.

"Summary for Potential Power Saving Enhancements", Agenda Item: 8.7.1.1, Source: Moderator (MediaTek), 3GPP TSG RAN WG1 e-Meeting #102, R1-2007063, Aug. 17-28, 2020, 48 pages.

Extended European Search Report issued in corresponding European Application No. 25191065.9, mailed Nov. 5, 2025, 15 pages.

Discussion on TRS/CSI-RS occasion(s) for idle/inactive UEs, Source: vivo, Agenda Item: 8.7.1.2, 3GPP TSG RAN WG1 #102-e R1-2005389, e-Meeting, Aug. 17-28, 2020, 7 pages.

* cited by examiner

WIRELESS COMMUNICATION METHOD, TERMINAL DEVICE, AND NETWORK DEVICE

CROSS REFERENCE TO RELATED APPLICATION(S)

The present disclosure is a continuation of International Application No. PCT/CN2020/120296 filed on Oct. 12, 2020, entitled "WIRELESS COMMUNICATION METHOD, TERMINAL DEVICE, AND NETWORK DEVICE", the contents of which are incorporated herein by reference in its entirety.

TECHNICAL FIELD

Embodiments of the present disclosure relate to the field of communication, and more particularly, to a wireless communication method, a terminal device, and a network device.

BACKGROUND

For a terminal device in a Connected state, time-frequency tracking can be performed through a reference signal such as a configured Channel State Information-Reference Signal (CSI-RS) or Tracking Reference Signal (TRS). For a terminal device in an idle state or an inactive state, the terminal device also needs to perform time-frequency tracking and Automatic Gain Control (AGC) before detecting paging in its corresponding Paging Occasion (PO). How to configure a reference signal such as CSI-RS and TRS for a terminal device in the idle state or the inactive state is an urgent problem to be solved.

SUMMARY

Embodiments of the present disclosure provide a wireless communication method, a terminal device, and a network device. The network device can configure resource information of a reference signal and/or monitoring occasion information of the reference signal for the terminal device in an idle state or an inactive state. Thus, the terminal device in the idle state or the inactive state can perform time-frequency tracking and automatic gain control before detecting paging at a paging occasion corresponding to the terminal device.

In a first aspect, there is provided a wireless communication method, and the method includes: receiving, by a terminal device, a common PDCCH, where the terminal device is in an idle state or an inactive state.

The common PDCCH carries target information and the target information is used for indicating at least one of: resource information of a reference signal, or monitoring occasion information of the reference signal.

In a second aspect, three is provided a wireless communication method, and the method includes: sending, by a network device, a common PDCCH to a terminal device in an idle state or an inactive state.

The common PDCCH carries target information and the target information is used for indicating at least one of: resource information of a reference signal, or monitoring occasion information of the reference signal.

In a third aspect, there is provided a terminal device, configured to perform the method in the first aspect as described above.

Specifically, the terminal device includes functional modules configured to perform the method in the first aspect as described above.

In a fourth aspect, there is provided a network device, configured to perform the method in the second aspect as described above.

Specifically, the network device includes functional modules configured to perform the method in the second aspect as described above.

In a fifth aspect, there is provided a terminal device, including a processor and a memory. The memory is configured to store a computer program, and the processor is configured to call and run the computer program stored in the memory to perform the method in the first aspect as described above.

In a sixth aspect, there is provided a network device, including a processor and a memory. The memory is configured to store a computer program, and the processor is configured to call and run the computer program stored in the memory to perform the method in the second aspect as described above.

In a seventh aspect, there is provided an apparatus configured to perform the method in any one of the first aspect to the second aspect as described above.

Specifically, the apparatus includes: a processor, configured to call and run a computer program from a memory, so that a device installed with the apparatus performs the method in any one of the first aspect to the second aspect as described above.

In an eighth aspect, there is provided a computer-readable storage medium, configured to store a computer program that causes a computer to perform the method in any one of the first aspect to the second aspect as described above.

In a ninth aspect, there is provided a computer program product, including computer program instructions, which cause the computer to perform the method in any one of the first aspect to the second aspect as described above.

In a tenth aspect, there is provided a computer program which, when run on a computer, causes the computer to perform the method in any one of the first aspect to the second aspect as described above.

Through the above technical solutions, the network device indicates the resource information of the reference signal and/or the monitoring occasion information of the reference signal to the terminal device in the idle state or the inactive state through the target information carried by the common PDCCH. That is to say, the technical solutions according to the present disclosure use the common PDCCH to carry the target information, which can avoid configuring a new PDCCH search space for the terminal device in the idle state or the inactive state, reduces system overhead, and has good backward compatibility.

DETAILED DESCRIPTION

Figure 1:
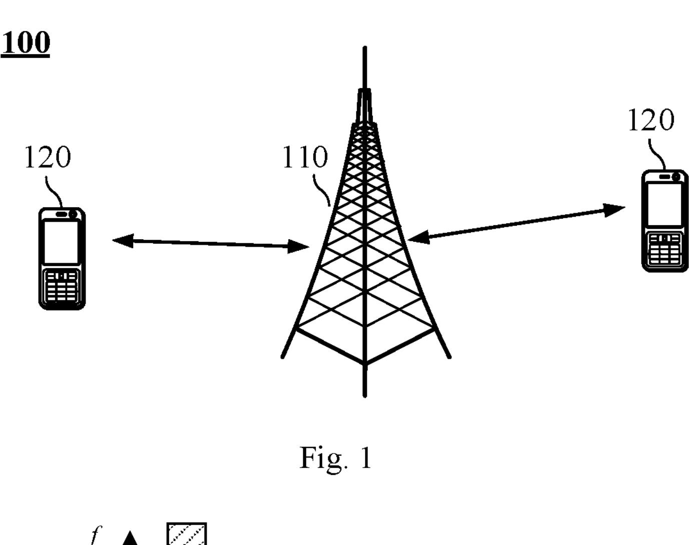
FIG. 1 is a schematic architectural diagram of a communication system to which an embodiment of the present disclosure is applied.

The technical solutions in embodiments of the present disclosure will be described below in combination with the drawings in embodiments of the present disclosure. Obviously, the described embodiments are part of embodiments of the present disclosure, rather than all the embodiments. For embodiments in the present disclosure, all other embodiments acquired by a person of ordinary skill in the art without creative work shall fall within the protection scope of the present disclosure.

The technical solutions in embodiments of the present disclosure are applicable to various communication systems, for example, a global system of mobile communication (GSM) system, a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a Non-Terrestrial Network (NTN) system, a universal mobile telecommunication system (UMTS), a wireless local area network (WLAN), a wireless fidelity (WiFi), a 5th-Generation (5G) communication system, or other communication systems.

Generally speaking, a conventional communication system generally supports a limited number of connections and therefore is easy to implement. However, with development of the communication technology, a mobile communication system will not only support conventional communication, but also support, for example, device to device (D2D) communication, machine to machine (M2M) communication, machine type communication (MTC), vehicle to vehicle (V2V) communication, or vehicle to everything (V2X) communication, etc. Embodiments of the present disclosure may also be applied to these communication systems.

Optionally, a communication system in embodiments of the present disclosure may be applied to a carrier aggregation (CA) scenario, a dual connectivity (DC) scenario, or a standalone (SA) networking scenario.

Optionally, the communication system in embodiments of the present disclosure may be applied to an unlicensed spectrum, where the unlicensed spectrum may also be considered as a shared spectrum. Alternatively, the communication system in embodiments of the present disclosure may also be applied to a licensed spectrum, where the licensed spectrum may also be considered a non-shared spectrum.

Embodiments of the present disclosure describe various embodiments in conjunction with a network device and a terminal device. The terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc.

The terminal device may be a station (ST) in WLAN. Alternatively, the terminal device may be a cellular phone, a cordless phone, a Session Initiation Protocol (SIP) phone, a Wireless Local Loop (WLL) station, a Personal Digital Assistant (PDA) device, a handheld device or a computing device with a wireless communication function, or other processing devices connected to a wireless modem, a vehicle-mounted device, a wearable device, or a terminal device in a next generation communication system, such as a terminal device in an NR network, or a terminal device in a future evolved Public Land Mobile Network (PLMN).

In embodiments of the present disclosure, the terminal device may be deployed on land, including indoor or outdoor, handheld, wearable, or vehicle-mounted terminal device. The terminal device may also be deployed on a water surface, such as on a ship). The terminal device may also be deployed in air, for example, on an aircraft, a balloon, a satellite, etc.

In embodiments of the present disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, or a wireless terminal device in smart home.

By way of example but not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing, and shoes. The wearable device is a portable device that is worn directly on a body or integrated into a user's clothes or accessories. The wearable device is not only a hardware device, but also implements powerful functions through software support, data interaction, and cloud interaction. Generalized wearable intelligent devices include a device with full features, a large size, and full or partial functions which may be implemented without relying on a smart phone, for example, a smart watch or smart glasses, as well as a device that is only focused on a certain application function and needs to cooperate with other devices such as a smart phone, for example, a smart bracelet and a smart jewelry for various physical sign monitoring.

In embodiments of the present disclosure, the network device may be a device for communicating with a mobile device, or an Access Point (AP) in WLAN, or a Base Transceiver Station (BTS) in GSM or CDMA, or a NodeB (NB) in WCDMA, or an Evolutional Node B (eNB or eNodeB) in Long Term Evolution (LTE), or a relay station or an access point, or a vehicle-mounted device, a wearable device, a network device or a base station (gNB) in the NR network, a network device in the future evolved PLMN network, or a network device in the NTN network.

As an example but not a limitation, in embodiments of the present disclosure, the network device may have a mobile feature. For example, the network device may be a mobile device. Optionally, the network device may be a satellite, a balloon station. For example, a satellite may be a low earth orbit (LEO) satellite, a medium earth orbit (MEO) satellite, a geostationary earth orbit (GEO) satellite, a high octagonal orbit (HEO) satellite, etc. Optionally, the network device may also be a base station disposed on land or in a water area.

In embodiments of the present disclosure, the network device provides services for a cell, and the terminal device communicates with the network device through transmission resources (for example, frequency domain resources, or spectrum resources) used by the cell. The cell may be a cell corresponding to the network device (e.g., a base station), and the cell may belong to a macro base station, or belong to a base station corresponding to a small cell. Here, the small cell may include a metro cell, a micro cell, a pico cell, a femto cell, etc. These small cells have characteristics such as small coverage and low transmit power, and are suitable for providing high-speed data transmission services.

Exemplarily, a communication system 100 applied in embodiments of the present disclosure is shown in FIG. 1. The communication system 100 may include a network device 110. The network device 110 may be a device communicating with a terminal device 120 (or referred to as a terminal or communication terminal). The network device 110 may provide communication coverage over a specific geographic region, and may communicate with the terminal located within the coverage region.

FIG. 1 exemplarily shows one network device and two terminal devices. Optionally, the communication system 100 may include a plurality of network devices, and a coverage range of each network device may include other numbers of terminal devices, which is not limited by embodiments of the present disclosure.

Optionally, the communication system 100 may also include other network entities such as a network controller and a mobile management entity, which is not limited by embodiments of the present disclosure.

It should be understood that a device having a communication function in a network or system according to embodiments of the present disclosure may be referred to as a communication device. The communication system 100 shown in FIG. 1 is taken as an example. The communication device may include a network device 110 and a terminal device 120 which have communication functions. The network device 110 and the terminal device 120 may be the above-mentioned specific devices, and descriptions thereof are omitted here. The communication device may also include other devices in the communication system 100, such as other network entities including the network controller, the mobile management entity, and the like, which is not limited by embodiments of the present disclosure.

It should be understood that the terms "system" and "network" may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "/" herein generally indicates that proceeding and following objects associated thereby are in an "or" relationship.

Terminologies used in the DETAILED DESCRIPTION section of the present disclosure are only for the purpose of explaining specific embodiments of the present disclosure, and are not intended to limit the present disclosure. The terms "first", "second", "third" and "fourth", or the like in the description, claims and drawings of the present disclosure are used to distinguish different objects, but not used to describe a specific order. Furthermore, the terms "include/comprise" and "have" and any variations thereof are intended to cover non-exclusive inclusion.

It should be understood that "indication/indicating" as mentioned in embodiments of the present disclosure may be direct indication or indirect indication, and may also represent there is an association relationship. For example, if A indicates B, it may mean that A directly indicates B. For example, B may be acquired through A. Also, it may mean that A indirectly indicates B. For example, A indicates C, and B may be acquired through C. Besides, it may also mean that there is an association relationship between A and B.

In the description of embodiments of the present disclosure, the term "corresponding/respective" may mean that there is a direct or indirect correspondence between two items, or may mean that there is an association relationship between the two items, or may also mean that there is an indicating-and-indicated relationship or a configuring-and-configured relationship between the two items.

In embodiments of the present disclosure, "predefinition/predefined" may mean that it is realized by pre-saving corresponding codes, tables or other ways that can be used to indicate relevant information in devices (for example, including the terminal device and the network device), and its specific implementation is not limited by the present disclosure. For example, the predefinition may refer to a definition in a protocol.

In embodiments of the present disclosure, the "protocol" may refer to a standard protocol in a communication field, which, for example, may include a LTE protocol, a NR protocol, and a related protocol applied to a future communication system, which is not limited by the present disclosure.

In order to better understand embodiments of the present disclosure, CSI-RS and TRS in the NR system related to the present disclosure will be described.

CSI-RS in NR is mainly used in the following aspects:

1. acquiring channel state information, for scheduling, link adaptation, and Multiple-In Multiple-Out (MIMO) related transmission settings.
2. beam management, where acquisition of beamforming weights for beams at the UE and base station sides is used to support a beam management process.
3. time-frequency tracking, which is realized by setting TRS in the system.
4. mobility management, where the system acquires and tracks CSI-RS signals of a current cell and a neighbour cell to complete measurement requirements related to UE's mobility management.
5. rate matching, where a function of rate matching at a Resource Element (RE) level of a data channel is completed by setting a zero-power CSI-RS signal.

In the NR system, in order to flexibly support the virtualized mapping of different antennas and the design of a codebook, and taking into account an actual application deployment scenario, the number of ports supported by NR is 1, 2, 4, 8, 12, 16, 24, 32, where each of 8-port, 12-port, 16-port, 24-port, and 32-port patterns is formed by combining 2-port or 4-port patterns. CSI-RSs of different antenna ports are multiplexed by frequency division, time division or code division to form a CSI-RS pattern. A CSI-RS pattern basic unit every X ports consists of Y adjacent REs in frequency domain and Z adjacent symbols in time domain within one Physical Resource Block (PRB).

1-port: (Y,Z)=(1,1);

2-port: (Y,Z)=(2,1);

4-port: (Y,Z)=(4,1) or (2,2).

Figure 2:
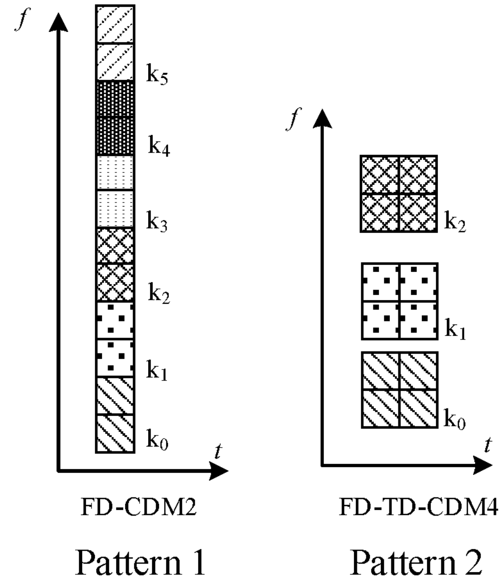
FIG. 2 is a schematic diagram of two CSI-RS patterns for 12 ports provided by an embodiment of the present disclosure.

For example, a 12-antenna-port CSI-RS defines two patterns, as shown in FIG. 2. Pattern 1 is a group containing 6 Code Division Multiplexing (CDM) 2s, where each CDM2 group contains 2 REs (Frequency Domain (FD)) on one symbol (Time domain (TD)), and the CSI-RS for two antenna ports are multiplexed by code division. Pattern 2 is a group containing 3 CDM4s, where each CDM4 group contains 4 REs (FD) on 2 symbols (TD), and the CSI-RS for four antenna ports is multiplexed by code division.

NR supports periodic, semi-persistent and aperiodic resource configurations. CSI-RS is a UE-specific configuration. Considering the resource overhead problem of CSI-RS, when a network configures CSI-RS, it tends to configure a set of CSI-RS resources to a plurality of UEs for sharing. The UE performs rate matching on a RE occupied by the configured CSI-RS. For example, if REs included in the resource allocation of Physical Downlink Shared Channel (PDSCH) include a RE of the CSI-RS configured by the network, puncturing is performed on these REs, without carrying PDSCH.

In order to enable the UE to track and compensate a time offset and a frequency offset of a downlink channel, the NR system defines a new reference signal for time-frequency tracking, which is referred to as TRS. TRS is also a CSI-RS in essence.

The NR system supports a periodic TRS and an aperiodic TRS. The periodic TRS is a CSI-RS resource set including a plurality of periodic CSI-RS resources, and the configuration of such resource set includes a higher layer signaling to indicate that the resource set is used as TRS. In order to achieve a certain range of time tracking, each CSI-RS resource is a 1-port CSI-RS resource with a density of 3. In addition, in order to achieve a range of frequency tracking, the TRS symbol interval in one slot is 4. TRS only supports 1 port, and thus all Non-Zero Power Channel State Information-Reference Signal (NZP-CSI-RS) resources configured in the CSI-RS resource set contain the same port index and correspond to the same antenna port.

For a low frequency band, the higher layer configures UE with a CSI-RS resource set containing four periodic CSI-RS resources. These four resources are distributed in two consecutive slots, each slot contains two periodic CSI-RS resources, and positions in time domain of the CSI-RS resources in the two slots are the same.

For a high frequency band, the higher layer configures UE with a CSI-RS resource set that is distributed on one slot and contains two periodic CSI-RS resources, or a CSI-RS resource set that is distributed on two consecutive slots and contains four periodic CSI-RS resources, and positions in time domain of the CSI-RS resources in the two slots are the same.

There are many aperiodic times and some periodic events in the system that cannot be aligned with the periodic TRS, which will seriously affect the demodulation of UE. In addition, after a beam in the high frequency band changes, it is also unacceptable that the time-frequency tracking cannot be performed according to TRS for a long time. Therefore, it is necessary to introduce an aperiodic TRS signal on the basis of the periodic TRS. The aperiodic TRS has the same structure as the periodic TRS, such as using the same bandwidth, having the same frequency domain position and the same number of slots in a TRS burst. Considering the consistency with a method for triggering an aperiodic CSI-RS, NR uses Downlink Control Information (DCI) to trigger the aperiodic TRS.

In order to better understand embodiments of the present disclosure, energy-saving technologies for terminals related to the present disclosure will be described.

In the evolution of NR technologies, higher requirements have been proposed for power saving of UE. For example, for the existing Discontinuous Reception (DRX) mechanism, in each active duration (also called On Duration), UE needs to continuously detect Physical Downlink Control Channel (PDCCH) to determine whether a base station schedules data transmission that is sent to itself. However, for most UEs, there may be no need to receive data transmission for a long time, but it is still necessary to maintain a regular wake up mechanism to monitor possible downlink transmissions. For such UEs, there is room for further optimization on power saving. The situation is similar to a terminal in a Radio Resource Control (RRC) idle state receiving a paging message.

In Release 16 (R16) standards, an energy saving signal is introduced to achieve further energy saving. The energy-saving signal is used in combination with the DRX mechanism, and the terminal receives indication of an energy-saving wake-up signal before the DRX ON duration. When the terminal has data to be transmitted in a DRX period, the energy-saving wake-up signal "wakes up" the terminal to monitor PDCCH during the DRX On duration. Otherwise, when the terminal has no data to be transmitted in the DRX period, the energy-saving wake-up signal does not "wake up" the terminal, and the terminal does not need to monitor PDCCH during the DRX On Duration. When the terminal has no data to be transmitted, the terminal may omit the PDCCH monitoring during the DRX On duration for energy saving. The time when the terminal is outside the DRX On Duration is called an inactive time, and the time when the terminal is in the DRX On Duration is called an active time.

In the NR system, the network may send paging to UEs in the idle state and the connected state. A paging process may be triggered by a core network or a base station, so as to send a paging request to a UE in the idle state, or to notify system information modification, and to notify the UE to receive information such as Earthquake and Tsunami Warning System (ETWS) information and Commercial Mobile Alert System (CMAS) information. After receiving a paging message from the core network, the base station interprets contents in the paging message to acquire a Tracking Area Identity (TAI) and a Tracking Area list (TA list) of the UE, and performs air interface paging in a cell belonging to tracking areas in the list. A core network domain of the paging message will not be decoded at the base station, but transparently transmitted to the UE. After receiving the paging message from the core network, the base station aggregates paging messages of UEs with the same Paging Occasion (PO) into one paging message, and transmits it to the relevant UEs through a paging channel. The UE receives a paging parameter through a system message, calculates the PO in combination with its own terminal identity (UE_ID), and receives the paging message at the corresponding time. The paging message is carried by PDSCH, and the UE acquires paging indication information by detecting the PDCCH scrambled with a Paging-Radio Network Temporary Identity (P-RNTI), so as to receive the paging message. The UE in the Idle state will save power by means of DRX, and the UE acquires DRX-related information from a System Information Block (SIB) 2. The PDCCH scrambled by P-RNTI is monitored in a PO on a Paging Frame (PF) in the DRX period to receive the paging message.

PF indicates which system frame number the paging message should appear on, and PO indicates a possible moment of occurrence. One PF frame may include one or more POs, and the UE only needs to monitor its own PO in each DRX period or paging cycle. A System Frame Number (SFN) that satisfies the following formula 1 may be used as a PF:

$$(\text{SFN}+\text{PF\_offset}) \bmod T = (T \operatorname{div} N)*(\text{UE\_ID} \bmod N) \qquad \text{Formula 1}$$

Figure 3:
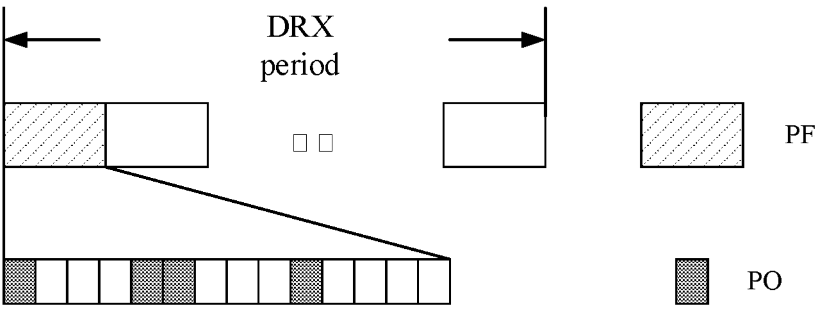
FIG. 3 is a schematic diagram of PF and PO in a DRX period provided by an embodiment of the present disclosure.

Within the PF, an index (that is, i_s) of the PO corresponding to the UE_ID may be calculated according to the following formula 2:

$$i\_s = \text{floor}(\text{UE\_ID}/N) \bmod Ns \qquad \text{Formula 2}$$

where T represents a DRX period of the UE. In a case that a default DRX period indicated in the system message is denoted as T_sib, if a DRX value T_ue of the UE has been configured, then T=min(T_ue, T_sib), and if T_ue is not configured, a default value indicated in the system message is used, T=T_sib. UE_ID=(5G-S-TMSI mod 1024). N is the number of PFs in T. Ns is the number of POs in one PF. PF_offset is a frame offset used for determining PF. 5G-S-TMSI indicates the 5G Serving-Temporary Mobile Subscriber Identity (S-TMSI). The position of PF within the DRX period and the position of PO within the PF are shown in FIG. 3.

For a terminal device in a RRC-connected state, time-frequency tracking may be performed through a reference signal such as a configured CSI-RS or TRS. For a terminal device in an idle state or an inactive state, the terminal device also needs to perform time-frequency tracking and Automatic Gain Control (AGC) before detecting paging in its corresponding Paging Occasion (PO). Since the terminal device in the idle state or the inactive state is not configured with the reference signal such as CSI-RS and TRS, there is a need to introduce CSI-RS and TRS for the terminal device in the idle state or the inactive state. However, how to indicate resources of CSI-RS and TRS for the terminal device in the idle state or the inactive state is a problem to be solved.

In view of the above problems, the present disclosure proposes a scheme for configuring a reference signal. The network device may configure resource information of the reference signal and/or monitoring occasion information of the reference signal for a terminal device in an idle state or inactive state, so that the terminal device in the idle state or the inactive state may perform time-frequency tracking and automatic gain control before detecting paging in its corresponding paging occasion.

The technical solutions of the present disclosure are described in detail below through specific embodiments.

Figure 4:
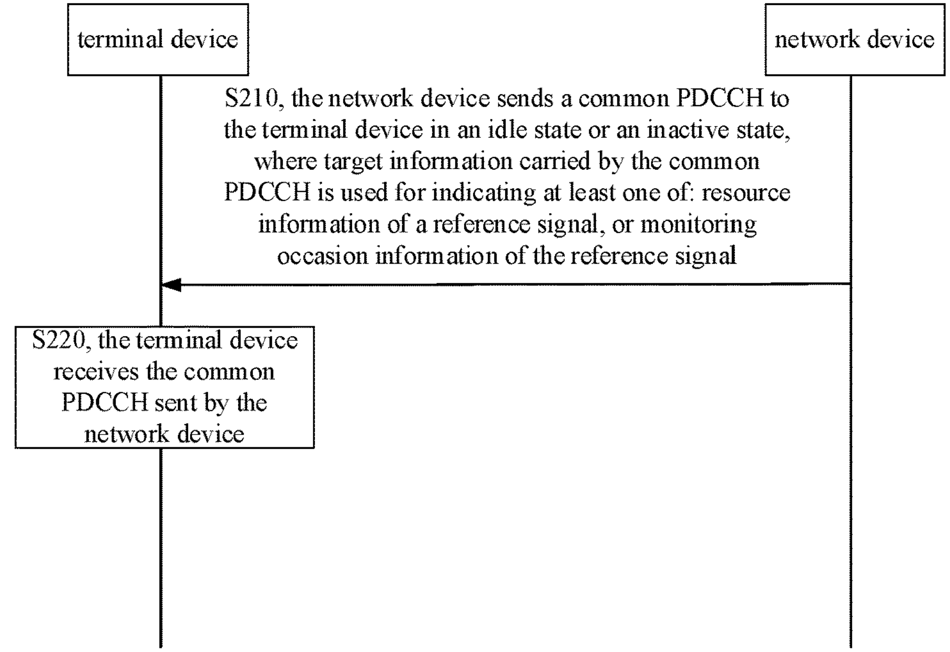
FIG. 4 is a schematic flowchart of a wireless communication method provided according to an embodiment of the present disclosure.

FIG. 4 is a schematic flowchart of a wireless communication method 200 according to an embodiment of the present disclosure. As shown in FIG. 4, the method 200 may include at least part of the following contents.

In S210, a network device sends a common PDCCH to a terminal device in an idle state or an inactive state, where target information carried by the common PDCCH is used for indicating at least one of: resource information of a reference signal, or monitoring occasion information of the reference signal.

In S220, the terminal device receives the common PDCCH sent by the network device.

In embodiments of the present disclosure, the network device indicates the resource information of the reference signal and/or the monitoring occasion information of the reference signal to the terminal device in the idle state or inactive state through the target information carried by the common PDCCH. This helps to avoid configuring a new PDCCH search space for the terminal device in the idle state or the inactive state to indicate a relevant parameter of the reference signal, reduces system overhead, and has good backward compatibility.

Optionally, the reference signal includes but is not limited to at least one of: a CSI-RS or a TRS.

The terminal device in the idle state or the inactive state may perform time-frequency tracking and automatic gain control based on the reference signal such as CSI-RS or TRS before detecting paging at a PO corresponding to the terminal device, so as to recover time-frequency synchronization before the PO arrives, and then receive PDCCH and PDSCH during the PO.

It should be noted that the search space of the common PDCCH is in the type of a common search space, and the terminal device in the idle state or the inactive state may also receive the common PDCCH through the common search space.

The common PDCCH is introduced in detail through Example 1 and Example 2 below.

In Example 1, the common PDCCH is Type0-PDCCH.

The Type0-PDCCH may be used for indicating scheduling information of a PDSCH carrying SIB1, and the search space of the Type0-PDCCH is indicated by a PDCCH-ConfigSIB1 information field in Master Information Block (MIB) information, and is used by the terminal device to receive SIB1.

Optionally, the format of DCI is DCI format 1_0, and the DCI is scrambled by a System Information-Radio Network Temporary Identity (SI-RNTI).

For example, SI-RNTI scrambles Cyclic Redundancy Check (CRC) of DCI format 1_0.

Optionally, contents carried by the DCI format 1_0 whose CRC is scrambled by SI-RNTI are as follows:

frequency domain resource allocation information;
time domain resource allocation information;
mapping from virtual resource block to physical resource block;
modulation and coding mode;
redundant version;
system message type indication; and
reserved bit.

The reserved bit includes 15 bits.

Optionally, in Example 1, the target information is part or all of the reserved bits in the DCI carried by the common PDCCH.

For example, several bits in the reserved bits are defined to indicate resource information of CSI-RS and TRS.

Optionally, in Example 1, the period of the monitoring occasion of the common PDCCH is related to the multiplexing pattern of Synchronization Signal Block (SSB) control resource set.

For example, for Multiplexing Pattern 1, the period of the monitoring occasion of the common PDCCH is 20 ms, that is, 2 radio frames.

For another example, for Multiplexing Pattern 2 or 3, the period of the monitoring occasion of the common PDCCH is the same as the period of SSB.

In Example 2, the common PDCCH is a Type2-PDCCH.

The Type2-PDCCH may be used for indicating scheduling information of a PDSCH carrying a paging message. The search space set of the Type2-PDCCH is configured in SIB1, and may be configured as a separate search space set, or configured to be the same as the search space set of Type0-PDCCH.

Optionally, in Example 2, the format of the DCI is DCI format 1_0, and the DCI is scrambled by a Paging-Radio Network Temporary Identity (P-RNTI).

For example, the P-RNTI scrambles the CRC of DCI format 1_0.

Optionally, contents carried by DCI format 1_0 whose CRC is scrambled by P-RNTI are as follows:

short message indicator;

short message;

frequency domain resource allocation information;

time domain resource allocation information;

mapping from virtual resource block to physical resource block;

modulation and coding mode;

transport block scaling; and reserved bit.

Optionally, in Example 2, the target information includes but is not limited to at least one of:

part or all of reserved bits in DCI carried by the common PDCCH;

at least one bit in short message indicator information in DCI carried by the common PDCCH; or at least one bit in short message in DCI carried by the common PDCCH.

Optionally, in Example 2, the resource information or the monitoring occasion information of the reference signal may be indicated by several bits among the reserved bits. It is also possible to define a new short message type for indication. Specifically, the DCI format 1_0 scrambled by P-RNTI carries the short message indicator information (2 bits) and the short message (8 bits).

The short message indicator information indicates the contents carried by the DCI, as shown in Table 1 below.

TABLE 1

| Bit(s) | Short Message indicator |
|---|---|
| 00 | Reserved |
| 01 | Only scheduling information for Paging is included in DCI |
| 10 | Only short message is included in DCI |
| 11 | Both scheduling information for Paging and short message are included in DCI |

In order to carry the resource information or the monitoring occasion information of the reference signal by the DCI format 1_0 scrambled by P-RNTI, the short message indicator information may be set to 00, so as to distinguish from other three pieces of information. Alternatively, the short message indicator information may be set to 10, so as to further indicate the resource information or the monitoring occasion information of the reference signal through the short message.

Contents of the short message are shown in Table 2 below, including system message modification indication, ETWS and CMAS indication, and indication to stop monitoring PDCCH in PO, where 4 to 8 bits thereof may be used for indicating the resource information or the monitoring occasion information of the reference signal.

TABLE 2

| Bit(s) | Short Message |
|---|---|
| 1 | systemInfoModification |
| 2 | etwsAndCmasIndication |
| 3 | stopPagingMonitoring |
| 4-8 | Reserved |

Optionally, in some embodiments, the resource corresponding to the resource information of the reference signal is shared with the terminal device in the connected state. That is to say, the resources of CSI-RS and TRS corresponding to the terminal device in the idle state or the inactive state are shared with the terminal device in the RRC-Connected state. Therefore, the resource overhead of CSI-RS and TRS can be reduced.

Optionally, in some embodiments, in a case where the target information is at least used for indicating the resource information of the reference signals, the target information is specifically used for indicating that one or more resources in a first reference signal resource set are resources of the reference signal, or the target information is specifically used for indicating that one or more reference signal resource sets in a reference signal resource configuration are resources of the reference signal.

Optionally, the first reference signal resource set is acquired from system information sent by the network device. For example, the terminal device acquires the first reference signal resource set from SIB1 in the system information sent by the network device. In this case, the number of bits occupied by the target information is dependent on the number of resources included in the first reference signal resource set, or the target information occupies a fixed number of bits.

Optionally, the reference signal resource configuration is acquired from the system information sent by the network device. For example, the terminal device acquires the reference signal resource configuration from SIB1 in the system information sent by the network device. In this case, the number of bits occupied by the target information is dependent on the number of reference signal resource sets included in the reference signal resource configuration, or the target information occupies a fixed number of bits. For example, the CSI-RS resource configuration may include one or more NZP-CSI-RS resource sets, and one NZP-CSI-RS resource set includes one or more NZP-CSI-RS resources, including a period of a CSI-RS resource, a position of a RE in a PRB, all symbols within a slot, etc. The reference signal resource indication information may indicate an NZP-CSI-RS resource set ID or an NZP-CSI-RS resource ID.

It should be noted that when the NZP-CSI-RS resource set is configured as TRS, the corresponding reference signal resource indication information may indicate a resource of TRS.

Optionally, the resource type of the reference signal indicated by the target information includes at least one of: a periodic type, an aperiodic type, or a semi-persistently scheduling type.

Optionally, in embodiments of the present disclosure, the terminal device monitors the reference signal according to the resource information of the reference signal indicated by the target information, or the terminal device monitors the reference signal according to the resource information of the reference signal indicated by the target information and a monitoring time interval.

Accordingly, the network device may send the reference signal according to the resource information of the reference signal indicated by the target information, or the network device may send the reference signal according to the resource information of the reference signal indicated by the target information and the monitoring time interval.

Optionally, the monitoring time interval is pre-configured or pre-defined by a protocol, or the monitoring time interval is configured by information carried in the common PDCCH.

Figure 5:
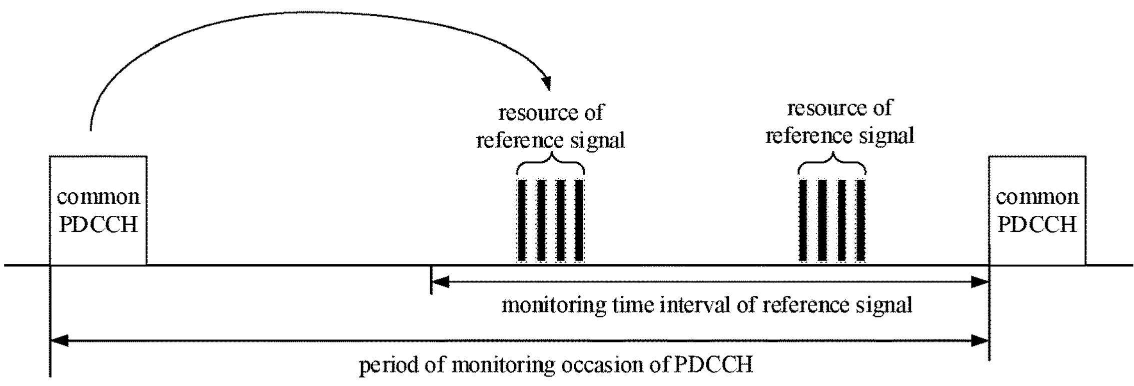
FIG. 5 is a schematic diagram of a monitoring reference signal provided according to an embodiment of the present disclosure.

For example, as shown in FIG. 5, the terminal device detects the common PDCCH in the monitoring occasion of the common PDCCH and acquires the resource information of the reference signal based on the target information carried by the common PDCCH. The terminal device may monitor the reference signal within one monitoring time interval of the reference signal, such as one monitoring time interval in a time interval after the monitoring occasion of the common PDCCH and before the next monitoring occasion of the common PDCCH. It should be noted that the monitoring time interval may not exist, and the terminal device always performs reception according to a resource of the reference signal indicated by the resource information of the reference signal.

Optionally, in some embodiments, in a case where the target information is at least used for indicating the monitoring occasion information of the reference signal, the target information is specifically used for indicating one or more monitoring occasions for the terminal device to monitor the reference signal.

Optionally, in the case where the target information is at least used for indicating the monitoring occasion information of the reference signal, the terminal device receives the system information sent by the network device, and the system information is used for semi-statically configuring the resource information of the reference signal.

That is to say, the network device may semi-statically configure part of the resources of the reference signal such as CSI-RS and TRS to be shared by the terminal device in the idle state or the inactive state and the terminal device in the connected state. For the terminal device in the idle state or the inactive state, this part of the resources may not need to be changed frequently, thereby avoiding the extra power consumption of the terminal device caused by frequent reception.

Optionally, the monitoring occasion information of the reference signal indicated by the target information is determined according to period information in the resource information of the reference signal configured by the system information. That is, the monitoring occasion of the reference signal such as CSI-RS and TRS may be determined according to the period information in the resource information of the reference signal such as CSI-RS and TRS.

Further, the terminal device may determine a resource and an occasion for receiving the reference signal according to the monitoring occasion information of the reference signal indicated by the target information and the resource information of the reference signal configured by the system information, and/or determine an occasion, in the resource information of the reference signal configured by the system information, not for receiving the reference signal.

Accordingly, the network device may determine a resource and an occasion for sending the reference signal according to the monitoring occasion information of the reference signal indicated by the target information and the resource information of the reference signal configured by the system information, and/or determine, in the resource information of the reference signal configured by the system information, an occasion not for sending the reference signal.

For example, in a case where the target information is at least used for indicating the monitoring occasion information of the reference signal, the target information may indicate that the terminal device receives the reference signal in a first monitoring occasion after receiving the common PDCCH carrying the target information, or the target information may indicate that the terminal device receives the reference signal in several monitoring occasions after receiving the common PDCCH carrying the target information. The monitoring occasion information may include information about the number of monitoring occasions. The terminal device may determine the occasion and the resource required for receiving the reference signal according to the monitoring occasion information of the reference signal indicated by the target information and in combination with the resource information of the reference signal indicated in the system message, so as to receive the reference signal. In addition, the terminal device may also not receive the reference signal in other monitoring occasions determined in the resource information of the reference signal, for the purpose of power saving.

Optionally, the terminal device may monitor the reference signal according to the monitoring occasion information of the reference signal indicated by the target information, or the terminal device may monitor the reference signal according to the monitoring occasion information of the reference signal indicated by the target information and the monitoring time interval.

Accordingly, the network device may send the reference signal according to the monitoring occasion information of the reference signal indicated by the target information, or the network device may send the reference signal according to the monitoring occasion information of the reference signal indicated by the target information and the monitoring time interval.

Therefore, monitoring of the reference signal can be reduced, and the purpose of power saving can be achieved for the terminal.

Optionally, the monitoring time interval is pre-configured or pre-defined by a protocol, or the monitoring time interval is configured by information carried in the common PDCCH.

Figure 6:
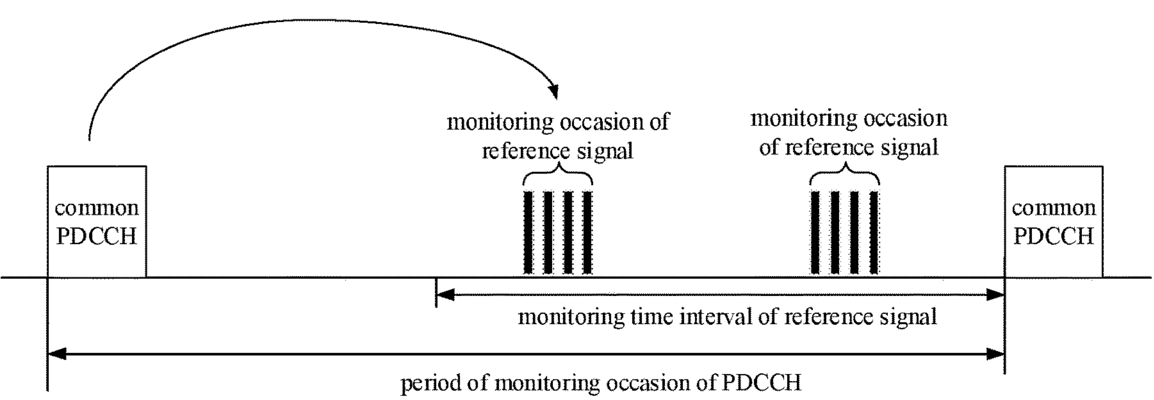
FIG. 6 is a schematic diagram of another monitoring reference signal provided according to an embodiment of the present disclosure.

For example, as shown in FIG. 6, the terminal device detects the common PDCCH in the monitoring occasion of the common PDCCH, and acquires the monitoring occasion information of the reference signal based on the target information carried by the common PDCCH. The terminal device may monitor the reference signal within one monitoring time interval of the reference signal. It should be noted that the monitoring time interval may not exist, and the terminal device always receives the reference signal according to the monitoring occasion information of the reference signal.

Optionally, in some embodiments, the terminal device may determine a monitoring occasion of the common PDCCH according to the search space set of the common PDCCH.

Optionally, in some other embodiments, the terminal device determines the monitoring occasion of the common PDCCH according to the search space set of the common PDCCH and first indication information. The first indication information is used for indicating part of the monitoring occasions of the common PDCCH, or the first indication information is used to determine part of the monitoring occasions of the common PDCCH.

Optionally, the first indication information may be a period scaling factor and an offset value. In this case, the first indication information may be used to determine part of the monitoring occasions of the common PDCCH, and the first indication information may be used to expand the period of the monitoring occasion of the common PDCCH and to determine the monitoring occasion after the period is expanded, thereby reducing the monitoring occasions of the common PDCCH.

Figure 7:
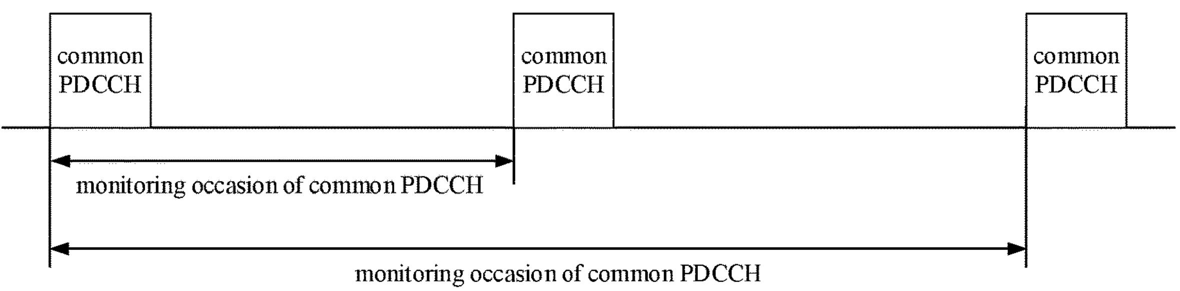
FIG. 7 is a schematic diagram for monitoring a common PDCCH provided according to an embodiment of the present disclosure.

For example, as shown in FIG. 7, the terminal device determines the monitoring occasion of the common PDCCH according to the search space set of the common PDCCH. The terminal device does not need to detect and acquire relevant information of the reference signal in other monitoring occasions in a monitoring period of the common PDCCH.

Optionally, the first indication information is acquired from the system information sent by the network device, or the first indication information is acquired from the common PDCCH.

It should be noted that if the first indication information is acquired from the common PDCCH, the terminal device may blindly detect the common PDCCH. After detecting the common PDCCH, the monitoring occasion of the common PDCCH may be determined base on the first indication information acquired from the common PDCCH and the search space set of the common PDCCH.

Therefore, monitoring of the common PDCCH carrying the target information can be reduced, and the purpose of power saving can be achieved for the terminal.

Therefore, in embodiments of the present disclosure, the network device indicates the resource information of the reference signal and/or the monitoring occasion information of the reference signal to the terminal device in the idle state or the inactive state through the target information carried by the common PDCCH. That is to say, the technical solutions of the present disclosure use the common PDCCH to carry the target information, which can avoid configuring a new PDCCH search space for the terminal device in the idle state or the inactive state, reduces system overhead, and has good backward compatibility. In addition, the technical solutions of the present disclosure can reduce the monitoring of the common PDCCH carrying the target information, so as to achieve the purpose of power saving for the terminal.

The method embodiments of the present disclosure are described in detail above with reference to FIGS. 4 to 7, and apparatus embodiments of the present disclosure are described in detail below with reference to FIGS. 8 to 12. It should be understood that the apparatus embodiments and the method embodiments correspond to each other, and for the similar description, reference may be made to the method embodiments.

Figure 8:
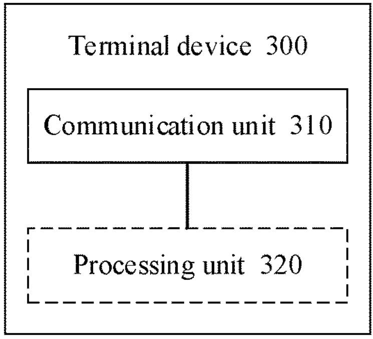
FIG. 8 is a schematic block diagram of a terminal device provided according to an embodiment of the present disclosure.

FIG. 8 shows a schematic block diagram of a terminal device 300 according to an embodiment of the present disclosure. As shown in FIG. 8, the terminal device 300 includes: a communication unit 310, configured to receive a common Physical Downlink Control Channel (PDCCH). The terminal device is in an idle state or an inactive state.

Target information carried by the common PDCCH is used for indicating at least one of: resource information of a reference signal, or monitoring occasion information of the reference signal.

Optionally, the target information is part or all of reserved bits in Downlink Control Information (DCI) carried by the common PDCCH.

Optionally, the format of DCI is DCI format 1_0, and the DCI is scrambled by a System Information-Radio Network Temporary Identity (SI-RNTI).

Optionally, the common PDCCH is a Type0-PDCCH.

Optionally, the period of the monitoring occasion of the common PDCCH is the same as the period of Synchronization Signal Block (SSB).

Optionally, the target information includes at least one of:

part or all of reserved bits in DCI carried by the common PDCCH;

at least one bit in short message indicator information in DCI carried by the common PDCCH; or at least one bit in short message in DCI carried by the common PDCCH.

Optionally, the format of DCI is DCI format 1_0, and the DCI is scrambled by a Paging-Radio Network Temporary Identity (P-RNTI).

Optionally, the common PDCCH is a Type2-PDCCH.

Optionally, in a case where the target information is used for indicating the resource information of the reference signal, the target information is specifically used for indicating that one or more resources in a first reference signal resource set are resources of the reference signal, or the target information is specifically used for indicating that one or more reference signal resource sets in a reference signal resource configuration are the resources of the reference signal.

Optionally, the first reference signal resource set is acquired from system information sent by a network device, or the reference signal resource configuration is acquired from the system information sent by the network device.

Optionally, the number of bits occupied by the target information is dependent on the number of resources included in the first reference signal resource set.

Alternatively, the number of bits occupied by the target information is dependent on the number of reference signal resource sets included in the reference signal resource configuration.

Alternatively, the target information occupies a fixed number of bits.

Optionally, the resource type of the reference signal indicated by the target information includes at least one of: a periodic type, an aperiodic type, or a semi-persistently scheduling type.

Optionally, the communication unit 310 is further configured to monitor the reference signal according to the resource information of the reference signal indicated by the target information. Alternatively, the communication unit 310 is further configured to monitor the reference signal according to the resource information of the reference signal indicated by the target information and a monitoring time interval.

Optionally, in a case where the target information is used for indicating the monitoring occasion information of the reference signal, the target information is specifically used for indicating one or more monitoring occasions for the terminal device to monitor the reference signal.

Optionally, the communication unit 310 is further configured to receive system information, and the system information is used for semi-statically configuring the resource information of the reference signal.

Optionally, the monitoring occasion information of the reference signal indicated by the target information is determined according to period information in the resource information of the reference signal configured by the system information.

Optionally, the terminal device 300 further includes: a processing unit 320, configured to determine a resource and an occasion for receiving the reference signal according to the monitoring occasion information of the reference signal indicated by the target information and the resource information of the reference signal configured by the system information, and/or to determine an occasion, in the resource information of the reference signal configured by the system information, not for receiving the reference signal.

Optionally, the communication unit 310 is further configured to monitor the reference signal according to the monitoring occasion information of the reference signal indicated by the target information. Alternatively, the communication unit 310 is further configured to monitor the reference signal according to the monitoring occasion information of the reference signal indicated by the target information and a monitoring time interval.

Optionally, the monitoring time interval is pre-configured or pre-defined by a protocol. Alternatively, the monitoring time interval is configured by information carried in the common PDCCH.

Optionally, a resource corresponding to the resource information of the reference signal is shared with a terminal device in a connected state.

Optionally, the reference signal includes at least one of: a Channel State Information-Reference Signal (CSI-RS) or a Tracking Reference Signal (TRS).

Optionally, the terminal device 300 further includes: a processing unit 320, configured to determine the monitoring occasion of the common PDCCH according to the search space set of the common PDCCH.

Optionally, the processing unit 320 is specifically configured to: determine the monitoring occasion of the common PDCCH according to the search space set of the common PDCCH and first indication information. The first indication information is used for indicating part of monitoring occasions of the common PDCCH. Alternatively, the first indication information is used for determining part of monitoring occasions of the common PDCCH.

Optionally, the first indication information is acquired from the system information sent by the network device, or the first indication information is acquired from the common PDCCH.

Optionally, in some embodiments, the aforementioned communication unit may be a communication interface or a transceiver, or an input/output interface of a communication chip or a system-on-chip. The aforementioned processing unit may be one or more processors.

It should be understood that the terminal device 300 according to embodiments of the present disclosure may correspond to the terminal device in the method embodiments of the present disclosure, and the abovementioned and other operations and/or functions of each unit in the terminal device 300 are to implement corresponding processes of the terminal device in the method 200 shown in FIG. 4, respectively, and will not be repeated here for brevity.

Figure 9:
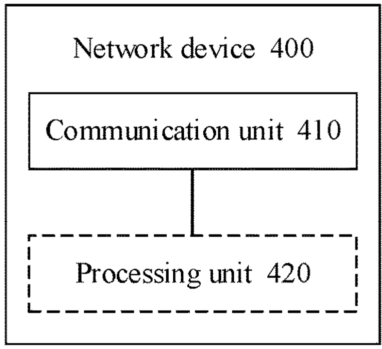
FIG. 9 is a schematic block diagram of a network device provided according to an embodiment of the present disclosure.

FIG. 9 shows a schematic block diagram of a network device 400 according to an embodiment of the present disclosure. As shown in FIG. 9, the network device 400 includes: a communication unit 410, configured to send a common Physical Downlink Control Channel (PDCCH) to a terminal device in an idle state or an inactive state.

Target information carried by the common PDCCH is used for indicating at least one of: resource information of a reference signal, or monitoring occasion information of the reference signal.

Optionally, the target information is part or all of reserved bits in Downlink Control Information (DCI) carried by the common PDCCH.

Optionally, the format of DCI is DCI format 1_0, and the DCI is scrambled by a System Information-Radio Network Temporary Identity (SI-RNTI).

Optionally, the common PDCCH is a Type0-PDCCH.

Optionally, the period of the monitoring occasion of the common PDCCH is the same as the period of Synchronization Signal Block (SSB).

Optionally, the target information includes at least one of:

- part or all of reserved bits in DCI carried by the common PDCCH;
- at least one bit in short message indicator information in DCI carried by the common PDCCH; or
- at least one bit in short message in DCI carried by the common PDCCH.

Optionally, the format of DCI is DCI format 1_0, and the DCI is scrambled by a Paging-Radio Network Temporary Identity (P-RNTI).

Optionally, the common PDCCH is a Type2-PDCCH

Optionally, in a case where the target information is used for indicating the resource information of the reference signal, the target information is specifically used for indicating that one or more resources in a first reference signal resource set are resources of the reference signal, or the target information is specifically used for indicating that one or more reference signal resource sets in a reference signal resource configuration are the resources of the reference signal.

Optionally, the first reference signal resource set is acquired from system information sent by the network device, or the reference signal resource configuration is acquired from the system information sent by the network device.

Optionally, the number of bits occupied by the target information is dependent on the number of resources included in the first reference signal resource set.

Alternatively, the number of bits occupied by the target information is dependent on the number of reference signal resource sets included in the reference signal resource configuration.

Alternatively, the target information occupies a fixed number of bits.

Optionally, the resource type of the reference signal indicated by the target information includes at least one of: a periodic type, an aperiodic type, or a semi-persistently scheduling type.

Optionally, the communication unit 410 is further configured to send the reference signal according to the resource information of the reference signal indicated by the target information. Alternatively, the communication unit 410 is further configured to send the reference signal according to the resource information of the reference signal indicated by the target information and a monitoring time interval.

Optionally, in a case where the target information is used for indicating the monitoring occasion information of the reference signal, the target information is specifically used for indicating one or more monitoring occasions for the terminal device to monitor the reference signal.

Optionally, the communication unit 410 is further configured to send system information to the terminal device. The system information is used for semi-statically configuring the resource information of the reference signal.

Optionally, the monitoring occasion information of the reference signal indicated by the target information is determined according to period information in the resource information of the reference signal configured by the system information.

Optionally, the network device further includes a processing unit 420. The processing unit 420 is configured to: determine a resource and an occasion for receiving the reference signal by the terminal device according to the monitoring occasion information of the reference signal indicated by the target information and the resource information of the reference signal configured by the system information; and/or determine an occasion, in the resource information of the reference signal configured by the system information, not for receiving the reference signal.

Optionally, the communication unit 410 is further configured to send the reference signal according to the monitoring occasion information of the reference signal indicated by the target information. Alternatively, the communication unit 410 is further configured to send the reference signal according to the monitoring occasion information of the reference signal indicated by the target information and a monitoring time interval.

Optionally, the monitoring time interval is pre-configured or pre-defined by a protocol, or the monitoring time interval is configured by information carried in the common PDCCH.

Optionally, a resource corresponding to the resource information of the reference signal is shared with a terminal device in a connected state.

Optionally, the reference signal includes at least one of: a Channel State Information-Reference Signal (CSI-RS) or a Tracking Reference Signal (TRS).

Optionally, the monitoring occasion of the common PDCCH is determined by the terminal device according to the search space set of the common PDCCH.

Optionally, the monitoring occasion of the common PDCCH is determined by the terminal device according to the search space set of the common PDCCH and first indication information. The first indication information is used for indicating part of monitoring occasions of the common PDCCH, or the first indication information is used for determining part of monitoring occasions of the common PDCCH.

Optionally, the first indication information is acquired from the system information sent by the network device, or the first indication information is acquired from the common PDCCH.

Optionally, in some embodiments, the aforementioned communication unit may be a communication interface or a transceiver, or an input/output interface of a communication chip or a system-on-chip. The aforementioned processing unit may be one or more processors.

It should be understood that the network device 400 according to embodiments of the present disclosure may correspond to the network device in the method embodiments of the present disclosure, and the abovementioned and other operations and/or functions of each unit in the network device 400 are to implement corresponding processes of the network device in the method 200 shown in FIG. 4, respectively, and will not be repeated here for brevity.

Figure 10:
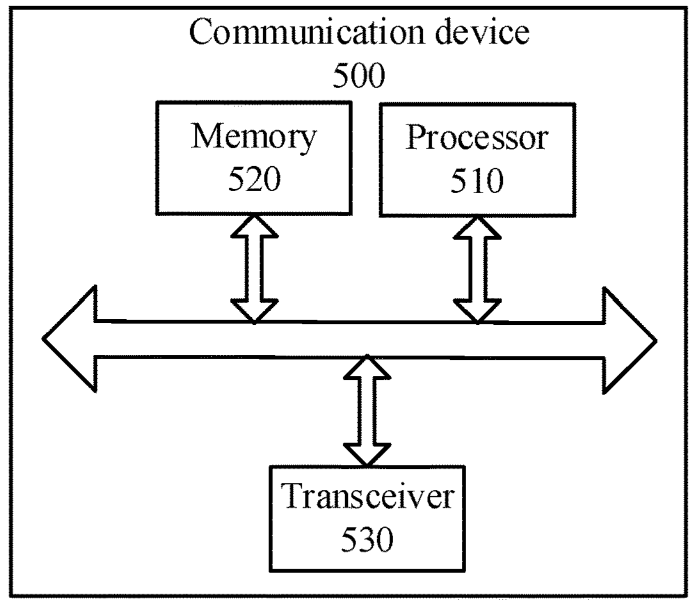
FIG. 10 is a schematic block diagram of a communication device provided according to an embodiment of the present disclosure.

FIG. 10 is a schematic structural diagram of a communication device 500 provided by an embodiment of the present disclosure. The communication device 500 shown in FIG. 10 includes a processor 510. The processor 510 may call a computer program from a memory and run the computer program, to implement the method in embodiments of the present disclosure.

Optionally, as shown in FIG. 10, the communication device 500 may further include a memory 520. The processor 510 may call the computer program from the memory 520 and run the computer program, to implement the method in embodiments of the present disclosure.

The memory 520 may be a separate component independent of the processor 510, or may be integrated into the processor 510.

Optionally, as shown in FIG. 10, the communication device 500 may further include a transceiver 530. The processor 510 may control the transceiver 530 to communicate with another device. Specifically, the transceiver 530 may transmit information or data to another device, or receive information or data transmitted by another device.

The transceiver 530 may include a transmitter and a receiver. The transceiver 530 may further include an antenna. There may be one or more antennas.

Optionally, the communication device 500 may be the network device in embodiments of the present disclosure, and the communication device 500 may implement respective procedures performed by the network device in various methods according to embodiments of the present disclosure. For brevity, details are not described herein again.

Optionally, the communication device 500 may be the mobile device or terminal device in embodiments of the present disclosure, and the communication device 500 may implement respective procedures performed by the mobile device or terminal device in various methods according to embodiments of the present disclosure. For brevity, details are not described herein again.

Figure 11:
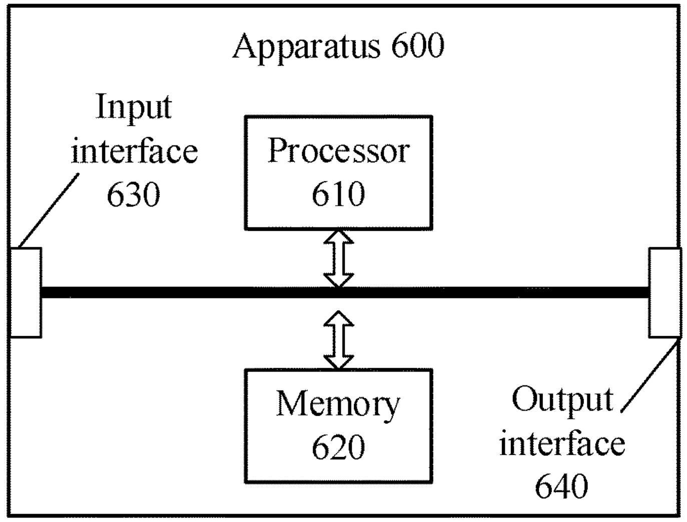
FIG. 11 is a schematic block diagram of an apparatus provided according to an embodiment of the present disclosure.

FIG. 11 is a schematic structural diagram of an apparatus according to an embodiment of the present disclosure. The apparatus 600 shown in FIG. 11 includes a processor 610 which can call and run a computer program from a memory to implement the method according to embodiments of the present disclosure.

Optionally, as shown in FIG. 11, the apparatus 600 may further include a memory 620. The processor 610 can call and run the computer program from the memory 620 to implement the method in embodiments of the present disclosure.

The memory 620 may be a separate device independent of the processor 610, or may be integrated in the processor 610.

Optionally, the apparatus 600 may further include an input interface 630. The processor 610 may control the input interface 630 to communicate with other devices or chips, and specifically, to acquire information or data transmitted by other devices or chips.

Optionally, the apparatus 600 may further include an output interface 640. The processor 610 may control the output interface 640 to communicate with other devices or chips, and specifically, to output information or data to other devices or chips.

Optionally, the apparatus may be applied to the network device in embodiments of the present disclosure, and the apparatus may implement respective procedures performed by the network device in various methods according to embodiments of the present disclosure. For brevity, details are not described herein again.

Optionally, the apparatus may be applied to the mobile device or terminal device in embodiments of the present disclosure, and the apparatus may implement respective procedures performed by the mobile device or terminal device in various methods according to embodiments of the present disclosure. For brevity, details are not described herein again.

Optionally, the apparatus mentioned in embodiments of the present disclosure may also be a chip, which, for example, may be a system-level chip, a system chip, a chip system, or a system-on-chip.

Figure 12:
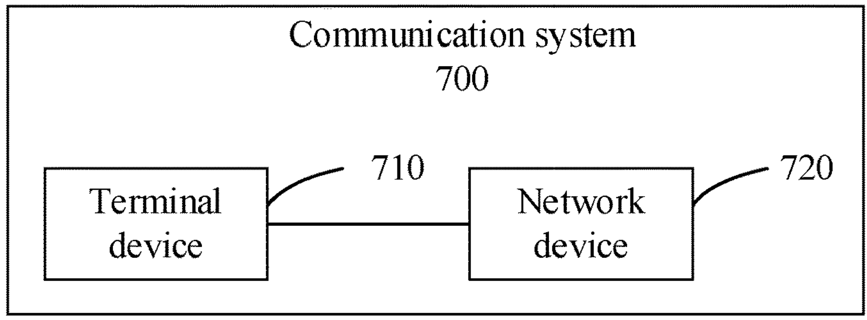
FIG. 12 is a schematic block diagram of a communication system provided according to an embodiment of the present disclosure.

FIG. 12 is a schematic block diagram of a communication system 700 provided by an embodiment of the present disclosure. As shown in FIG. 12, the communication system 700 includes a terminal device 710 and a network device 720.

The terminal device 710 may be configured to implement respective functions performed by the terminal device in the above methods, and the network device 720 may be configured to implement respective functions performed by the network device in the above methods. For brevity, details are not described herein again.

It is to be understood that the processor in embodiments of the present disclosure may be an integrated circuit chip and has a signal processing capability. In an implementation, steps in the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical device, a discrete gate or a transistor logical device, or a discrete hardware component, which may implement or perform the methods, operations and logical block diagrams disclosed in embodiments of the present disclosure. The universal processor may be a microprocessor, or the processor may also be any conventional processor and the like. Steps of the methods disclosed in combination with embodiments of the present disclosure may be directly embodied as being executed and completed by a hardware decoding processor, or being executed and completed by a combination of hardware and software modules in the decoding processor. The software modules may be located in a mature storage medium in the art, such as a Random Access Memory (RAM), a flash memory, a Read-Only memory (ROM), a Programmable ROM (PROM), Electrically Erasable PROM (EEPROM), or a register. The storage medium is located in a memory, the processor reads information in the memory, and completes steps of the methods in combination with hardware.

It can be understood that the memory in embodiments of the present disclosure may be a volatile memory or a nonvolatile memory, or may include both volatile and nonvolatile memories. The nonvolatile memory may be a ROM, a PROM, an Erasable PROM (EPROM), an Electrically EPROM (EEPROM), or a flash memory. The volatile memory may be a RAM, and is used as an external high-speed cache. By way of exemplary illustration but not limitation, RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory in the systems and methods described in the present disclosure is intended to include, but is not limited to, memories of these and any other proper types.

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), among others. That is to say, the memory in embodiments of the present disclosure is intended to include but is not limited to those and any other suitable types of memories.

Embodiments of the present disclosure further provide a computer-readable storage medium. The computer-readable storage medium is configured to store a computer program.

Optionally, the computer-readable storage medium may be applied to the network device in embodiments of the present disclosure, and the computer program causes a computer to carry out respective processes implemented by the network device in various methods according to embodiments of the present disclosure. For the sake of brevity, details are not described herein again.

Optionally, the computer-readable storage medium may be applied to the mobile terminal or terminal device in embodiments of the present disclosure, and the computer program causes a computer to carry out respective processes implemented by the mobile terminal or terminal device in various methods according to embodiments of the present disclosure. For the sake of brevity, details are not described herein again.

Embodiments of the present disclosure further provide a computer program product that includes computer program instructions.

Optionally, the computer program product may be applied to the network device in embodiments of the present disclosure, and the computer program instructions cause a computer to carry out respective processes implemented by the network device in various methods according to embodiments of the present disclosure. For the sake of brevity, details are not described herein again.

Optionally, the computer program product may be applied to the mobile terminal or terminal device in embodiments of the present disclosure, and the computer program instructions cause a computer to carry out respective processes implemented by the mobile terminal or terminal device in various methods according to embodiments of the present disclosure. For the sake of brevity, details are not described herein again.

Embodiments of the present disclosure further provide a computer program.

Optionally, the computer program may be applied to the network device in embodiments of the present disclosure. When running on a computer, the computer program causes the computer to carry out respective processes implemented by the network device in various methods according to embodiments of the present disclosure. For the sake of brevity, details are not described herein again.

Optionally, the computer program may be applied to the mobile terminal or terminal device in embodiments of the present disclosure. When running on a computer, the computer program causes the computer to carry out respective processes implemented by the mobile terminal or terminal device in various methods according to embodiments of the present disclosure. For the sake of brevity, details are not described herein again.

Those of ordinary skill in the art will appreciate that the exemplary units and algorithm steps described in connection with embodiments disclosed herein may be carried out by electronic hardware or a combination of electronic hardware and computer software. Whether the functions are implemented by hardware or software depends on particular applications and design constraints of the technical solutions. A person skilled in the art may use a different method to implement the described functions for each of the particular applications, and such implementation should not be considered as going beyond the protection scope of the present disclosure.

It may be clearly understood by a person skilled in the art that, for the purpose of convenient and brief description, with respect to the detailed working process of the system, device, and unit, reference may be made to a corresponding process in the foregoing method embodiments, details of which are not described herein again.

According to embodiments provided by the present disclosure, it should be understood that the disclosed systems, devices, and methods may be implemented in other ways. For example, the device embodiments described above are merely illustrative. For example, the division of units is only a kind of logical function division. In practice implementations, there may be other division manners. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may be or may not be physically separated, and the parts displayed as units may be or may not be physical units. That is, the units may be located in one place, or may be distributed over multiple network units. Some or all of the units may be selected according to actual needs so as to achieve the objectives of the solutions in embodiments.

In addition, individual functional units in each embodiment of the present disclosure may be integrated in one processing unit, or the units may exist separately physically, or two or more units may be integrated in one unit.

The functions may also be stored in a computer-readable storage medium if being implemented in the form of software functional unit and sold or used as an independent product. Based on such understanding, the part being essential or contributing to the prior art of the technical solutions of the present disclosure, or just part of the technical solutions, may be embodied in the form of software product. The computer software product is stored in a storage medium, and includes instructions to cause a computer device (which may be a personal computer, a server, or a network device, etc.) to perform all or part of steps of the methods described in embodiments of the present disclosure. The foregoing storage medium includes any medium that is capable of storing program codes, such as a USB disk, a mobile hard disk, a Read Only Memory (ROM), a Random Access Memory (RAM), a magnetic disk, an optical disk, or the like.

Those described above are merely specific embodiments of the present disclosure, and the protection scope of the present disclosure is not limited thereto. Any change or substitution that is readily conceived of by a person skilled in the art within the technical scope disclosed in the present disclosure shall fall within the protection scope of the present disclosure. Therefore, the protection scope of the present disclosure shall be defined by the appended claims.

What is claimed is:

1. A wireless communication method, comprising:

receiving, by a terminal device, a common Physical Downlink Control Channel (PDCCH), the terminal device being in an idle state or an inactive state, wherein target information carried by the common PDCCH is used for indicating at least one of: resource information of a reference signal, or monitoring occasion information of the reference signal, wherein, in a case where the target information is used for indicating the resource information of the reference signal, the target information is specifically used for indicating that one or more reference signal resource sets in a reference signal resource configuration are the resources of the reference signal;

wherein the reference signal resource configuration is acquired from the system information sent by the network device;

wherein a number of bits occupied by the target information is dependent on the number of the one or more reference signal resource sets comprised in the reference signal resource configuration; and wherein the reference signal comprises a Tracking Reference Signal (TRS).

2. The method according to claim 1, wherein the target information is part or all of reserved bits in Downlink Control Information (DCI) carried by the common PDCCH.

3. The method according to claim 1, wherein the target information comprises at least one of:

part or all of reserved bits in DCI carried by the common PDCCH;

at least one bit in short message indicator information in the DCI carried by the common PDCCH; or at least one bit in a short message in the DCI carried by the common PDCCH, wherein a format of the DCI is DCI format 1_0, and the DCI is scrambled by a Paging-Radio Network Temporary Identity (P-RNTI); and/or wherein the common PDCCH is a Type2-PDCCH.

4. The method according to claim 1, wherein the method further comprises:

monitoring, by the terminal device, the reference signal according to the resource information of the reference signal indicated by the target information, or monitoring, by the terminal device, the reference signal according to the resource information of the reference signal indicated by the target information and a monitoring time interval.

5. The method according to claim 4, wherein the monitoring time interval is pre-configured or pre-defined by a protocol, or the monitoring time interval is configured by information carried in the common PDCCH.

6. The method according to claim 1, wherein, in a case where the target information is used for indicating the monitoring occasion information of the reference signal, the target information is specifically used for indicating one or more monitoring occasions for the terminal device to monitor the reference signal.

7. The method according to claim 6, wherein the method further comprises:

receiving, by the terminal device, system information, wherein the system information is used for semi-statically configuring the resource information of the reference signal.

8. The method according to claim 7, wherein the monitoring occasion information of the reference signal indicated by the target information is determined according to period information in the resource information of the reference signal configured by the system information.

9. The method according to claim 8, wherein the method further comprises:

determining, by the terminal device, a resource and an occasion for receiving the reference signal according to the monitoring occasion information of the reference signal indicated by the target information and the resource information of the reference signal configured by the system information, and/or determining, by the terminal device, an occasion, in the resource information of the reference signal configured by the system information, not for receiving the reference signal.

10. The method according to claim 6, wherein the method further comprises:

monitoring, by the terminal device, the reference signal according to the monitoring occasion information of the reference signal indicated by the target information, or monitoring, by the terminal device, the reference signal according to the monitoring occasion information of the reference signal indicated by the target information and a monitoring time interval.

11. The method according to claim 1, wherein the method further comprises:

determining, by the terminal device, the monitoring occasion of the common PDCCH according to a search space set of the common PDCCH.

12. The method according to claim 11, wherein the determining, by the terminal device, the monitoring occasion of the common PDCCH according to the search space set of the common PDCCH, comprises:

determining, by the terminal device, the monitoring occasion of the common PDCCH according to the search space set of the common PDCCH and first indication information, wherein the first indication information is used for indicating part of monitoring occasions of the common PDCCH, or the first indication information is used for determining part of the monitoring occasions of the common PDCCH, wherein the first indication information is acquired from system information sent by the network device, or the first indication information is acquired from the common PDCCH.

13. A wireless communication method, comprising:

sending, by a network device, a common Physical Downlink Control Channel (PDCCH) to a terminal device in an idle state or an inactive state, wherein target information carried by the common PDCCH is used for indicating at least one of: resource information of a reference signal, or monitoring occasion information of the reference signal, wherein, in a case where the target information is used for indicating the resource information of the reference signal, the target information is specifically used for indicating that one or more reference signal resource sets in a reference signal resource configuration are the resources of the reference signal;

wherein the reference signal resource configuration is acquired from the system information sent by the network device;

wherein a number of bits occupied by the target information is dependent on the number of the one or more reference signal resource sets comprised in the reference signal resource configuration; and wherein the reference signal comprises a Tracking Reference Signal (TRS).

14. The method according to claim 13, wherein the method further comprises:

sending, by the network device, the reference signal according to the resource information of the reference signal indicated by the target information, or sending, by the network device, the reference signal according to the resource information of the reference signal indicated by the target information and a monitoring time interval.

15. The method according to claim 13, wherein, in a case where the target information is used for indicating the monitoring occasion information of the reference signal, the target information is specifically used for indicating one or more monitoring occasions for the terminal device to monitor the reference signal.

16. The method according to claim 15, wherein the method further comprises:

sending, by the network device, system information to the terminal device, wherein the system information is used for semi-statically configuring the resource information of the reference signal.

17. The method according to claim 16, wherein the monitoring occasion information of the reference signal indicated by the target information is determined according to period information in the resource information of the reference signal configured by the system information.

18. The method according to claim 17, wherein the method further comprises:

determining, by the network device, a resource and an occasion for the terminal device to receive the reference signal according to the monitoring occasion information of the reference signal indicated by the target information and the resource information of the reference signal configured by the system information, and/or determining, by the network device, an occasion, in the resource information of the reference signal configured by the system information, not for receiving the reference signal.

19. The method according to claim 15, wherein the method further comprises:

sending, by the network device, the reference signal according to the monitoring occasion information of the reference signal indicated by the target information, or sending, by the network device, the reference signal according to the monitoring occasion information of the reference signal indicated by the target information and a monitoring time interval.

20. A terminal device, comprising: a processor and a memory, wherein the memory is configured to store a computer program, and the processor is configured to call and run the computer program stored in the memory, to perform a wireless communication method comprising:

receiving a common Physical Downlink Control Channel (PDCCH), the terminal device being in an idle state or an inactive state, wherein target information carried by the common PDCCH is used for indicating at least one of: resource information of a reference signal, or monitoring occasion information of the reference signal, wherein, in a case where the target information is used for indicating the resource information of the reference signal, the target information is specifically used for indicating that one or more reference signal resource sets in a reference signal resource configuration are the resources of the reference signal;

wherein the reference signal resource configuration is acquired from the system information sent by the network device;

wherein a number of bits occupied by the target information is dependent on the number of the one or more reference signal resource sets comprised in the reference signal resource configuration; and wherein the reference signal comprises a Tracking Reference Signal (TRS).

21. The terminal device according to claim 20, wherein the method further comprises:

monitoring the reference signal according to the resource information of the reference signal indicated by the target information, or monitoring the reference signal according to the resource information of the reference signal indicated by the target information and a monitoring time interval.

22. The terminal device according to claim 20, wherein, in a case where the target information is used for indicating the monitoring occasion information of the reference signal, the target information is specifically used for indicating one or more monitoring occasions for the terminal device to monitor the reference signal.

23. The terminal device according to claim 22, wherein the method further comprises:

receiving system information, wherein the system information is used for semi-statically configuring the resource information of the reference signal.

24. A network device, comprising: a processor and a memory, wherein the memory is configured to store a computer program, and the processor is configured to call and run the computer program stored in the memory, to perform the wireless communication method according to claim 13.

* * * * *